April 15, 1958     W. H. WENTLING     2,830,752
BLOWERS
Filed June 3, 1957
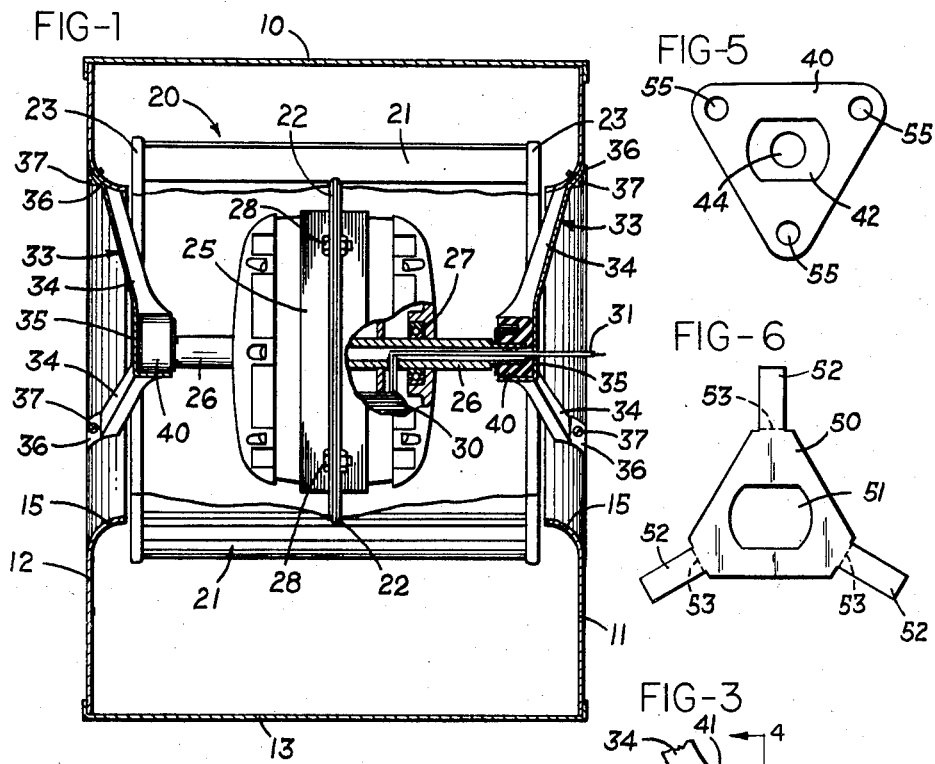
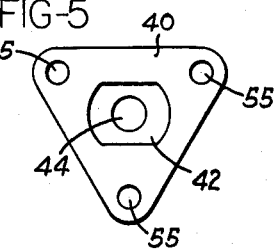
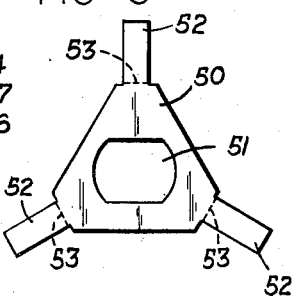
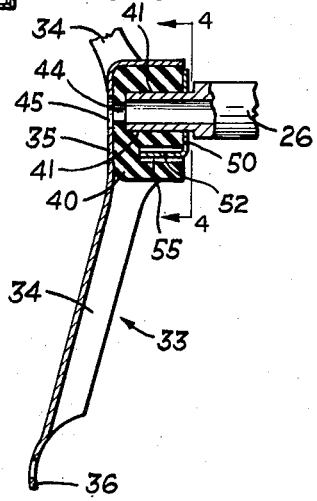
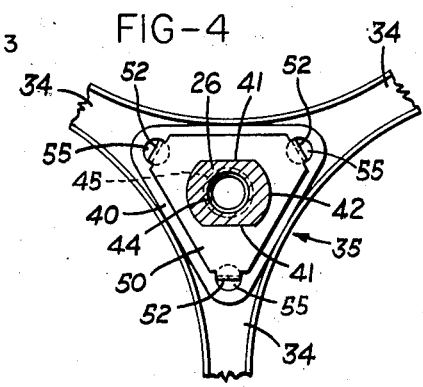
INVENTOR.
WILLIAM H. WENTLING
BY
ATTORNEYS United States Patent Office 2,830,752
Patented Apr. 15, 1958

2,830,752
BLOWERS

William H. Wentling, Dayton, Ohio, assignor to The Lau Blower Company, Dayton, Ohio, a corporation of Ohio Application June 3, 1957, Serial No. 663,244

5 Claims. (Cl. 230—117)

This invention relates to centrifugal blowers.

The invention has special relation to centrifugal blowers having a drive motor which is enclosed within the blower wheel and has its parts reversed from the normal arrangement in that the rotor is mounted for rotation about an internally located stator and directly carries the cage portion of the blower wheel, a typical such blower being shown in my Patent 2,776,088, issued January 1, 1957, to the assignee of this application. It is of great importance in blowers of this type that the stator be securely fixed against the possibility of rotation with the wheel, and at the same time it is also important that such mounting occupy as little space as possible in the inlets of the blower housing in order to minimize interference with the air supply to the wheel.

The above patent shows a form of mounting for the stator of the blower motor wherein the stator is positively secured on a shaft which is in turn equipped with a fixed mounting for each end thereof in brackets secured on the blower housing. The present invention is directed to a similar type of mounting for the fixed shaft of a blower of the above type, and it is a primary object of the invention to provide an improved and simplified device for mounting such shaft which will prevent the possibility of rotation of the shaft while at the same time effectively damping the transmission of vibrations between the shaft and the blower housing.

Another object of the invention is to provide a blower shaft mounting for the purpose outlined above which will have the additional advantage of requiring minimum fabricating operations on the shaft as well as the component parts of the mounting, and which also is readily useable with a hollow shaft having electrical connectors therein without any possibility of interference therewith.

Additional objects and advantages of the invention will be apparent from the following description, the accompanying drawings and the appended claims.

In the drawing—

Fig. 1 is a view generally in vertical section through a centrifugal blower of the above specified type;

Fig. 2 is an enlarged fragmentary view looking from left to right in Fig. 1 toward the mounting bracket of the shaft in Fig. 1, the view being partly broken away in vertical section;

Fig. 3 is a fragmentary section on the line 3—3 of Fig. 2;

Fig. 4 is an enlarged section on the line 4—4 of Fig. 3;

Fig. 5 is a detail elevational view looking toward the inside face of one of the rubber mounting blocks for the shaft in Figs. 1–4; and Fig. 6 is a detail elevational view illustrating the construction of the reinforcing plate used with the rubber block of Fig. 5 in the shaft mounting of Figs. 1–4.

Referring to the drawing, which illustrates a preferred embodiment of the invention, the blower housing 10 in Fig. 1 is of the usual generally volute shape and includes a pair of opposed scroll sides 11 and 12 secured together in spaced relation by the scroll back 13. The housing 10 is shown as of the double inlet type, with each of the scroll sides including an annular flange portion 15 which is curved inwardly of the housing to define a venturi ring forming one of the inlets to the interior of the housing. Additional details of the structure of the housing are shown in the above noted patent.

The blower wheel within housing 10 is identified generally as 20, and it embodies a cage structure composed of a plurality of blower blades 21 secured together by means of a pair of center disks 22 and a pair of end rings 23. The wheel 20 is mounted on and driven by a motor comprising an annular rotor 25 which is mounted for rotation directly on the shaft 26 by means of bearings 27, and which is secured directly to the wheel 20 by suitable bracket means shown as a lamination of extra diameter secured to the center disks 22 by bolts and nuts 28. The stator 30 is received within the rotor 25, and it includes the necessary field windings and is keyed or otherwise positively secured to shaft 26 to prevent relative rotation thereof. The leads 31 to stator 30 are supplied thereto through the center of shaft 26, which is hollow for that purpose.

The shaft 26 is supported at each end by a bracket 33 which is shown as of the same construction as the corresponding brackets in the above patent, and each bracket is shown as formed from a single piece of sheet metal to provide three arms 34 radiating from a central structure 35 which defines a socket of generally triangular cup shape. The arms 34 are formed to a channel shape in section for increased rigidity, and they also are inclined away from the socket 35 so that when their outer ends 36 are mounted on the inlet flange 15, as by the screws 37, the socket 35 will project within the interior of the housing beyond the inlet flange 15. Thus as shown in Fig. 1, the two cups 35 extend partially within the opposite ends of the wheel 20 in overlapping relation with the ends of shaft 26.

Each end of the shaft 26 is mounted in one of the sockets 35 by means of a block 40 of rubber complementary in shape to the socket 35 and received snugly therein. Each end of shaft 26 is provided with a non-circular configuration, such as a pair of flats 41, and the inner side of each block 40 is provided with a complementary shaped non-circular hole 42 for receiving the flatted end of the shaft snugly therein. Each block 40 also has a smaller through bore 44 in the bottom of the hole 42 which matches the center of the hollow shaft 26 and a center hole 45 in the bottom of socket 35 to receive the leads 31 therethrough. Normally only one of the brackets and blocks carries these leads, but it is simpler to construct all of these parts alike.

A reinforcing plate 50 of sheet metal overlies the inner surface of each of the blocks 44 and is of substantially the same outline as the block but of slightly smaller dimensions as shown in Fig. 4, and the plate 50 has a non-circular hole 51 therethrough which matches the flatted end of the shaft and the hole 42. In addition, each plate 50 is secured to its associated block 40 in non-rotatable relation by means of projections which are embedded in the block. This result is readily obtained by means of three tangs 52 at the corners of the plate 50 which are readily blanked out with the remainder of the plate from sheet stock and then formed at right angles to the plane of the plate on the dotted lines 53 in Fig. 6 for insertion in a corresponding set of three holes 55 molded in the corner portions of the inner surface of each block 40. As shown, satisfactory results are obtained with the holes 55 of cylindrical shape and the same diameter as the width of each tang 52.

When the blower is assembled by means of these mounting units of the invention, each end of the shaft 26 is in effect splined in one of the plates 50. These plates are in turn secured to their associated rubber blocks 40 in non-rotatable relation, and the blocks 40 are similarly fixedly mounted by their snug fit in the associated bracket sockets 35. In addition, the tangs 51 are located so near to the corners of the sockets 35 and rubber blocks 40 that upon any attempt at rotation of the shaft 26, the tangs 52 will be forced into engagement with the adjacent corner walls of the sockets 35 through the portions of the rubber blocks therebetween.

The result of this construction is therefore that the stator shaft is provided with positive limits against rotation, but at the same time, metal to metal connection between the shaft and its mounting brackets is prevented, and the rubber blocks 40 thus effectively damp the transmission of vibrations between the motor and the housing. This desirable result is further enhanced by the fact that the component parts of the mounting assemblies are of individually simple and inexpensive construction, requiring a minimum of special operations. Thus the blocks 40 are readily molded in their final finished form, and the plates 50 can be fabricated in quantity by simple progressive steps of blanking and forming. It is also a simple matter to provide the flats on the shaft 26 at nominal cost, and also the final assembly of these parts requires no special fitting or other time consuming operations.

While the form of apparatus herein described constitute a preferred embodiment of the invention, it is to be understood that the invention is not limited to this precise form of apparatus, and that changes may be made therein without departing from the scope of the invention which is defined in the appended claims.

What is claimed is:

1. In a centrifugal blower of the character described including a housing having an inlet in each side thereof, a blower wheel within the housing including a cage structure having blower blades therein, an annular rotor secured within said cage for rotation therewith, a stator received within said rotor in rotatable relation therewith, and a shaft secured to said rotor and projecting from both ends thereof, the combination of a bracket secured to one side of said housing in overlying relation with the adjacent said inlet and including means defining a socket of non-circular shape facing said inlet, a block of rubber material complementary in shape to said socket and received snugly therein, a reinforcing plate overlying the inner surface of said block, means securing said plate to the associated said block in non-rotatable relation with said block and said socket, said block having a hole therein for receiving the adjacent end of said shaft, said plate having a non-circular hole therethrough aligned with said hole in said block, said shaft having a non-circular portion at said end thereof complementary to said hole in said plate and engaged therein to secure said shaft against rotation with respect to said bracket, and bracket means supporting the other end of said shaft on the other side of said housing.

2. In a centrifugal blower of the character described including a housing having an inlet in each side thereof, a blower wheel within the housing including a cage structure having blower blades therein, an annular rotor secured within said cage for rotation therewith, a stator received within said rotor in rotatable relation therewith, and a shaft secured to said rotor and projecting from both ends thereof, the combination of a bracket secured to each side of said housing in overlying relation with the adjacent said inlet and including means defining a socket of non-circular shape facing said inlet, a block of rubber material complementary in shape to each said socket and received snugly therein, a reinforcing plate overlying the inner surface of each said block, means securing each said plate to the associated said block in non-rotatable relation with said block and said socket, each said block having a hole therein for receiving the adjacent end of said shaft, each said plate having a non-circular hole therethrough aligned with the hole in the associated said block, and said shaft having a non-circular portion at each end thereof complementary to said hole in said plates and engaged therein to secure said shaft against rotation with respect to said bracket.

3. In a centrifugal blower of the character described including a housing having an inlet in each side thereof, a blower wheel within the housing including a cage structure having blower blades therein, an annular rotor secured within said cage for rotation therewith, a stator received within said rotor in rotatable relation therewith, and a shaft secured to said rotor and projecting from both ends thereof, the combination of a bracket secured to each side of said housing in overlying relation with the adjacent said inlet and including means defining a socket of non-circular shape facing said inlet, a block of rubber material complementary in shape to said socket and received snugly therein, said block having a hole therein for receiving the adjacent end of said shaft, a reinforcing plate overlying the inner surface of said block and having a non-circular hole therethrough aligned with said hole in said block, said shaft having a non-circular portion at said end thereof complementary to said hole in said plate and engaged therein to secure said shaft against rotation with respect to said plate, at least one projection on said plate embedded within said block to secure said plate and block against relative rotation, said projection being located for engagement with said socket through said block in response to rotational movement of said block in said socket to provide a positive limit against rotation of said shaft with respect to said socket, and bracket means supporting the other end of said shaft on the other side of said housing.

4. In a centrifugal blower of the character described including a housing having an inlet in each side thereof, a blower wheel within the housing including a cage structure having blower blades therein, an annular rotor secured within said cage for rotation therewith, a stator received within said rotor in rotatable relation therewith, and a shaft secured to said rotor and projecting from both ends thereof, the combination of a bracket secured to each side of said housing in overlying relation with the adjacent said inlet and including means defining a socket facing said inlet and having substantially flat sides, a block of rubber material complementary in shape to said socket and received snugly therein, a reinforcing plate overlying the inner surface of each said block, projections on said plate embedded in said socket adjacent the corners thereof for engagement with the sides of said socket through said block to limit rotational movement of said block in said socket, said block having a hole therein for receiving the adjacent end of said shaft, said plate having a non-circular hole therethrough aligned with said hole in said block, said shaft having a non-circular portion at said end thereof complementary to said hole in said plate and engaged therein to secure said shaft against rotation with respect to said bracket, and bracket means supporting the other end of said shaft on the other side of said housing.

5. In a centrifugal blower of the character described including a housing having an inlet in each side thereof, a blower wheel within the housing including a cage structure having blower blades therein, an annular rotor secured within said cage for rotation therewith, a stator received within said rotor in rotatable relation therewith, and a shaft secured to said rotor and projecting from both ends thereof, the combination of a bracket secured to each side of said housing in overlying relation with the adjacent said inlet and including means defining a socket of generally triangular shape facing said inlet, a block of rubber material complementary in shape to said socket and received snugly therein, a reinforcing plate overlying the inner surface of each said block and of substantially the same shape and slightly smaller dimensions than said surface, a tang portion at each corner of said plate projecting at substantially right angles from the plane thereof into embedded relation within the corners of said block, said block having a hole therein for receiving the adjacent end of said shaft, said plate having a non-circular hole therethrough aligned with said hole in said block, said shaft having a non-circular portion at said end thereof complementary to said hole in said plate and engaged therein to secure said shaft against rotation with respect to said bracket, and bracket means supporting the other end of said shaft on the other side of said housing.

<p style="text-align:center;">No references cited.</p>

U. S. DEPARTMENT OF COMMERCE
PATENT OFFICE

CERTIFICATE OF CORRECTION

Patent No. 2,830,752     William H. Wentling     April 15, 1958

It is hereby certified that error appears in the printed specification of the above numbered patent requiring correction and that the said Letters Patent should read as corrected below.

Column 3, lines 42 and 67, column 4, lines 15, 43 and 70, for "rotor", each occurrence, read -- stator --.

Signed and sealed this 10th day of June 1958.

(SEAL)
Attest:

KARL H. AXLINE
Attesting Officer

ROBERT C. WATSON
Commissioner of Patents